United States Patent Office 3,351,426
Patented Nov. 7, 1967

3,351,426
METHOD OF PREPARATION OF
DIPERSULPHATES
John P. Leaver, Harpenden, and Anthony M. Hildon, Dunstable, England, assignors to Laporte Chemicals Limited, Kingsway, Luton, England, a British company
No Drawing. Continuation of application Ser. No. 220,040, Aug. 28, 1962. This application July 7, 1966, Ser. No. 563,615
Claims priority, application Great Britain, Aug. 31, 1961, 31,398/61
13 Claims. (Cl. 23—114)

ABSTRACT OF THE DISCLOSURE

Preparing dipersulphates by heating at a temperature from about 75° C. to 300° C. a reaction mixture consisting essentially of a permonosulphate, the corresponding bisulphate and hydrogen peroxide while maintaining a hydrogen peroxide vapor partial pressure of below 250 mm. Hg.

This is a continuation of application Ser. No. 220,040 filed Aug. 28, 1962 and now abandoned.

It is known that perdisulphates can be produced by the electrolysis of bisulphate solutions and that conveniently electrolysis of ammonium bisulphate is employed, perdisulphates other than that of ammonium being prepared by double decomposition of ammonium perdisulphate and a salt of the element desired. However, the perdisulphates of other elements thus obtained are normally contaminated with ammonium salts.

Perdisulphates, particularly the ammonium salt, have hitherto been obtained by the method described above as intermediates of the electrolytic hydrogen peroxide industry. The electrolytic method of producing hydrogen peroxide is however gradually being replaced by other methods, and it is therefore becoming necessary to install electrolytic plant solely for manufacture of persulphates.

It is an object of the present invention to provide a non-electrolytic process for the manufacture of perdisulphates, especially potassium perdisulphate.

Accordingly the present invention provides a process for the preparation of perdisulphates of lithium, sodium, potassium, rubidium, caesium, ammonium, beryllium, magnesium, calcium, strontium and barium comprising the step of heating the corresponding permonosulphate at a suitable temperature within the range 75° C. to 300° C. to form the perdisulphate and hydrogen peroxide, the partial pressure of the hydrogen peroxide in the reaction zone being maintained below 250 mm. Hg.

Preferably, the permonosulphate is prepared in a first step of the process by reacting the corresponding bisulphate and aqueous hydrogen peroxide within the temperature range 70° to 150° C. in such a manner that the hydrogen peroxide:bisulphate molar ratio is maintained above 1, the vapour phase in contact with the phase containing bisulphate containing at least 30 moles percent of hydrogen peroxide based on the hydrogen peroxide plus water content of the vapour and the combined partial pressures of hydrogen peroxide and water in the vapour phase not exceeding 100 mm. Hg.

The invention is thus based upon the reaction

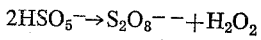

Preferably the partial pressure of the hydrogen peroxide in the reaction zone is maintained below 100 mm. Hg.

Conveniently the partial pressure of the hydrogen peroxide is maintained below the desired level by continuously applying a vacuum to the reaction zone or by passing a stream of gas which, under the conditions of the reaction, is inert to reactants and products. The gas can be pre-heated as that it provides the heat for the reaction. Air is a suitable gas.

Preferably the hydrogen peroxide removed from the reaction zone by the applied vacuum or by the stream of gas is collected as a by-product.

The elevated temperature is necessary to achieve conversion of the permonosulphate to perdisulphate. Below 75° C. the rate of conversion is too slow to be practicable. The conversion rate increases as the temperature is raised but the tendency of the perdisulphate to decompose also increases with increase in temperature. Thus the temperature is raised to as high a level as possible whilst causing minimum decomposition of the perdisulphate product. For the preparation of sodium or potassium perdisulphate the temperature for the perdisulphate forming step is preferably within the range 110° to 190° C. most preferably 140° to 160° C. It is preferable to maintain the temperature for the reaction below the temperature at which the perdisulphate would melt, since molten perdisulphate has a strong tendency to decompose. For the preparation of ammonium perdisulphate, which has a melting point of about 120° C. under the conditions of the reaction, the preferred temperature for the perdisulphate forming step is within the range of 90° C. to 120° C.

The extent of the reaction increases as the partial pressure of the hydrogen peroxide is decreased. Above a hydrogen peroxide partial pressure of 250 mm. Hg less than 30% conversion of permonosulphate to perdisulphate is obtained. It is preferred to maintain the hydrogen peroxide partial pressure as low as possible.

At 140° C. and less than 1 mm. Hg partial pressure of hydrogen peroxide, 96% molar conversion of permonosulphate to perdisulphate can be obtained.

If any hydrogen peroxide is allowed to remain in the reaction zone then for any temperature there is a particular partial pressure of hydrogen peroxide at which the hydrogen peroxide tends to react with part of the permonosulphate to form bisulphate, water and oxygen, with consequent reduction of the maximum possible conversion of permonosulphate to perdisulphate. At a temperature of 170° C. the said particular partial pressure is about 10 mm. Hg. At lower temperatures a lower partial pressure is required to prevent hydrogen peroxide reaction with permonosulphate.

However quite apart from these considerations it is desirable to remove hydrogen peroxide from the reaction zone to avoid the risk of explosion.

It is desirable to collect the hydrogen peroxide as a by-product. This may be effected by any of the known techniques, for example, a cold trap, a condenser, or a water extraction tower.

In the temperature range 75° C. to 140° C. the conversion rate can be increased by adding as catalysts, bisulphates or strong oxyacids, but the increased conversion rate does not exceed that obtained above 140° C. in the absence of catalysts.

If pure permonosulphate is fed into the reaction zone, fractional decomposition of permonosulphate to bisulphate occurs when heating is begun. With potassium however, the perdisulphate is less soluble in water than both the corresponding bisulphate and permonosulphate and so associated bisulphate and/or unreacted permonosulphate can be removed by washing to leave substantially pure potassium perdisulphate. Thus, although it is possible to achieve molar conversions of permonosulphate to perdisulphates of 96% by the process of the present invention, it is not essential to do so with potassium in order to obtain substantially pure perdisulphate, nor is it necessary to use bisulphate or hydrogen peroxide free potassium permonosulphate for the reaction.

The process described above for the production of the permonosulphates of sodium, potassium, ribidium, caesium and ammonium from the corresponding bisulphate and hydrogen peroxide is described in our co-pending Ser. No. 182,946, now Patent No. 3,203,756. Thus, the process of the co-pending application and the process of the present invention when coupled together provide a method for the preparation of perdisulphate from bisulphate. Further, in such a method the hydrogen peroxide produced with the perdisulphate can be used as a part of the hydrogen peroxide required to produce fresh permonosulphate.

The permonosulphate obtained by the process of the above co-pending application is in association with bisulphate and hydrogen peroxide. When this permonosulphate with associated bisulphate and hydrogen peroxide is used as the feed material for the process of the present invention, the conversion of permonosulphate to perdisulphate encourages some of the associated bisulphate and hydrogen peroxide to react and form further permonosulphate, which further permonosulphate reacts to form further perdisulphate. Thus the amount of perdisulphate in the product can be greater than the amount calculated from the equation, $$2HSO_5^- \rightarrow S_2O_8^{--} + H_2O_2$$

having regard to the amount of permonosulphate present in the said feed material. This point is illustrated in Examples 2, 3 and 4 below.

The process of the invention can be carried out in several types of apparatus either batchwise or continuously. A simple batchwise method comprises heating the permonosulphate, in a vessel at a pressure below 250 mm. Hg, which pressure is achieved by continuously applying a vacuum, hydrogen peroxide being withdrawn and condensed in a suitable trap.

Alternatively, the process of the invention can be carried out in a fluidised bed at normal pressure by passing a hot gas stream upwards through a bed of permonosulphate particles. The permonosulphate particles must be solid for the fluidised bed to operate efficiently. Thus the temperature must be within the range from 75° C. to the melting point of the permonosulphate, and so it may be necessary with certain permonosulphates to employ a temperature below the optimum. The hydrogen peroxide vapour is removed from the gas stream by passing the gas stream through a water extraction tower at normal pressure. The fluidised bed method is suitable for both batchwise and continuous operation.

The process can also be carried out batchwise by heating a static bed of permonosulphate particles and passing a hot gas stream through the bed. In such an application it is not essential to maintain the temperature below the melting point of the permonosulphate. The hydrogen peroxide is carried out of the vessel in the gas stream.

A type of apparatus suitable for the continuous application of the present invention is a "spray dryer." There is fed into the spray dryer a solution of slurry of permonosulphate. Molten permonosulphate could also be used as the feed, but this is not preferred because of the high feed temperatures which would be required to prevent solidification in for instance the feed nozzles. The hot gas which is used to heat the permonosulphate withdraws from the vessel the hydrogen peroxide vapour formed.

A further type of apparatus suitable for the continuous application of the present invention is a "drum dryer." The feed material is a solution, slurry or melt of permonosulphate. The heat from the surface of the drum causes the permonosulphate to form perdisulphate and hydrogen peroxide. A stream of gas can be passed over the drum to assist the evaporation and removal of the hydrogen peroxide.

The invention is further illustrated by the following examples:

Example 1

10.0 gm. of a mixture of potassium salts, containing 96.5% by weight of potassium permonoulphate and 3.5% by weight of potassium bisulphate, were placed in a glass vessel. The glass vessel had a single outlet which led to a glass tube passing through a cold trap at —78° C. A pressure of 0.5 mm. Hg was maintained in the vessel. Heat was then applied to give a temperature of 170° C. in the vessel, which temperature was maintained for 15 minutes.

The product in the vessel contained 8.24 gm. of potassium perdisulphate, 0.17 gm. of potassium permonosulphate and 0.57 gm. of potassium bisulphate. This represents a conversion of 96% of the potassium permonosulphate introduced. 0.84 gm. of hydrogen peroxide were found in the cold trap. This represents a hydrogen peroxide recovery of 81% by weight.

The potassium perdisulphate was then washed with water to remove the associated permonosulphate and bisulphate.

Example 2

Potassium permonosulphate was prepared by reacting potassium bisulphate with excess hydrogen peroxide at 100° C. and 40 mm. Hg according to the process described in co-pending application Ser. No. 182,946, now Patent No. 3,203,756. The product from this first stage had the following composition:

44.1% w./w. $KHSO_5$
31.7% w./w. $H_2O_2$
22.5% w./w. $KHSO_4$

This mixture is a solution at room temperature. 20 ml. of this solution was heated at 140° C. for 15 minutes at a pressure of 0.1 mm. Hg. The resulting product (a dry friable mass) had the following composition:

77.8% w./w. $K_2S_2O_3$
19.7 %w./w. $KHSO_4$
2.5% w./w. $KHSO_5$

This was purified by washing with water. The final dry product contained 98.2% w./w. $K_2S_2O_8$.

Example 3

Sodium permonosulphate was prepared by reacting sodium bisulphate with excess hydrogen peroxide at 100° C. and 40 mm. Hg according to the process described in co-pending application Ser. No. 182,946, now Patent No. 3,203,756.

The product from this stage was a liquid and had the following composition:

19.5% w./w. $NaHSO_5$
47.7% w./w. $NaHSO_4$
31.5% w./w. $H_2O_2$

When this mixture was heated at 140° C., 0.1 mm. Hg for 30 minutes, the resulting product (a dry friable mass) had the following composition:

29.3% $Na_2S_2O_8$
70.7% $NaHSO_4$

Example 4

Ammonium permonosulphate was prepared by reacting ammonium bisulphate with excess hydrogen peroxide at 100° C. and 40 mm. Hg according to the process described in co-pending application Ser. No. 182,946, now Patent No. 3,203,756.

The product from this stage had the following composition:

47.6% w./w. $NH_4HSO_5$
30.9% w./w. $NH_4HSO_4$
21.1% w./w. $H_2O_2$

When the mixture was heated at 100° C., 0.1 mm. Hg for 40 minutes the resulting product had the following composition.

62.3% w./w. $(NH_4)_2S_2O_8$
37.7% w./w. $NH_4HSO_4$

What is claimed is:
1. A process for the preparation of a perdisulphate selected from the group consisting of lithium, sodium, potassium, rubidium, cesium, ammonium, beryllium, magnesium, calcium, strontium, and barium perdisulphate which comprises the steps of heating the corresponding permonosulphate at a temperature of from 75° C. to 300° C. in a reaction mixture which consists essentially of the permonosulphate, the corresponding bisulphate and hydrogen peroxide while maintaining a hydrogen peroxide vapor partial pressure of below 250 mm. Hg and recovering the perdisulphate so formed.

2. A process according to claim 1 in which the partial pressure of hydrogen peroxide is maintained at below 100 mm. Hg.

3. A process according to claim 2 in which the partial pressure of hydrogen peroxide is maintained at below 10 mm. Hg.

4. A process according to claim 1 for the production of ammonium perdisulphate in which the reaction mixture is heated at a temperature of from 90° C. to 120° C.

5. A process according to claim 1 for the production of a perdisulphate selected from the group consisting of sodium and potassium perdisulphate in which the reaction mixture is heated at a temperature of from 110° C. to 190° C.

6. A process according to claim 1 for the production of a perdisulphate selected from the group consisting of sodium, potassium and ammonium perdisulphate in which the partial pressure of hydrogen peroxide is maintained at below 1 mm. Hg.

7. A process according to claim 1 in which the bisulphate is present in at least 3.5% by weight of the total weight of permonosulphate and bisulphate.

8. A process for the preparation of a perdisulphate selected from the group consisting of sodium, potassium, rubidium, cesium and ammonium perdisulphates, which comprises the steps of reacting the corresponding bisulphate and aqueous hydrogen peroxide at a temperature of from 70° C. to 150° C. and in such a manner that the hydrogen peroxide:bisulphate molar ratio is maintained above 1, the vapor phase in contact with the phase containing bisulphate contains at least 30 moles percent of hydrogen peroxide based on the hydrogen peroxide plus water content of the vapor, and the combined partial pressures of hydrogen peroxide and water in the vapor phase do not exceed 100 mm. Hg to form a reaction mixture consisting essentially of the corresponding permonosulphate, the bisulphate and hydrogen peroxide heating the reaction mixture in a reaction zone at a temperature of from 75° C. to 300° C. while maintaining the vapor partial pressure of hydrogen peroxide in the reaction zone at below 250 mm. Hg to form the corresponding perdisulphate and recovering the perdisulphate so formed.

9. A process according to claim 8, in which the partial pressure of hydrogen peroxide is maintained at below 100 mm. Hg.

10. A process according to claim 9, in which the partial pressure of hydrogen peroxide is maintained at below 10 mm. Hg.

11. A process according to claim 8 for the production of ammonium perdisulphate in which reaction mixture is heated at a temperature of from 90° C. to 120° C.

12. A process according to claim 8 for the production of a perdisulphate selected from the group consisting of sodium and potassium perdisulphates in which the reaction mixture is heated at from 110° C. to 190° C.

13. A process according to claim 8 for the production of a perdisulphate selected from the group consisting of sodium, potassium and ammonium perdisulphate in which the partial pressure of hydrogen peroxide is maintained at below 1 mm. Hg.

References Cited
UNITED STATES PATENTS

| | | | |
|---|---|---|---|
| 2,886,534 | 5/1959 | Lake et al. | 23—114 |
| 3,002,813 | 10/1961 | Darbee et al. | 23—114 |
| 3,203,756 | 8/1965 | Hildon | 23—114 |

EARL C. THOMAS, *Primary Examiner.*